United States Patent
Moreton-Smith et al.

(10) Patent No.: US 9,925,854 B2
(45) Date of Patent: Mar. 27, 2018

(54) DOOR MEMBER

(71) Applicant: JAGUAR LAND ROVER LIMITED, Warwickshire (GB)

(72) Inventors: Paul Moreton-Smith, Coventry (GB); Martin Halliwell, Coventry (GB); Martin Boonham, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 14/437,546

(22) PCT Filed: Oct. 28, 2013

(86) PCT No.: PCT/EP2013/072531
§ 371 (c)(1),
(2) Date: Apr. 22, 2015

(87) PCT Pub. No.: WO2014/064293
PCT Pub. Date: May 1, 2014

(65) Prior Publication Data
US 2015/0251527 A1    Sep. 10, 2015

(30) Foreign Application Priority Data

Oct. 26, 2012 (GB) .................................. 1219264.7

(51) Int. Cl.
*B60J 10/86* (2016.01)
*B62D 65/08* (2006.01)
(Continued)

(52) U.S. Cl.
CPC ........... *B60J 10/0088* (2013.01); *B29C 45/26* (2013.01); *B60J 5/0402* (2013.01); *B60J 5/0408* (2013.01);
(Continued)

(58) Field of Classification Search
CPC ... B60J 10/45; B60J 10/80; B60J 10/84; B60J 10/85; B60J 10/86; B60J 10/88
(Continued)

(56) References Cited

U.S. PATENT DOCUMENTS 5,050,349 A * 9/1991 Goto ..................... E06B 7/2303
49/441
5,296,067 A * 3/1994 Mesnel ................. E06B 7/2314
156/221
(Continued)

FOREIGN PATENT DOCUMENTS

DE    3340476 A1    5/1985
DE    3836687 A1    5/1990
(Continued)

OTHER PUBLICATIONS

PCT International Search Report for International application No. PCT/EP2013/072531 dated Feb. 4, 2014.
(Continued)

*Primary Examiner* — Hilary L Gutman
(74) *Attorney, Agent, or Firm* — Carlson, Gaskey & Olds

(57) ABSTRACT

The present invention relates to a door member (1) for mounting to a vehicle door (43). The door member (1) is moulded from a plastics material. The door member (1) includes a door seal mounting channel (3) for receiving a mounting portion (19) of a door seal (13). The door seal mounting channel (3) has first and second sidewalls (5, 7). A first projection (11) is optionally provided on the first sidewall (5) for engaging the mounting portion (19) of the door seal (13). The invention also relates to a door member (101) having an inner finisher (165) and an outer finisher (147). The invention further relates to a vehicle door (43) including a door member (1; 101) of the type described herein.

16 Claims, 8 Drawing Sheets

(51) Int. Cl.
*B60J 5/04* (2006.01)
*B60R 13/02* (2006.01)
*B29C 45/26* (2006.01)
*B60J 10/27* (2016.01)
*B60J 10/88* (2016.01)
*B60J 10/15* (2016.01)
*B60J 10/00* (2016.01)
*B60R 13/04* (2006.01)
*B29L 31/30* (2006.01)

(52) U.S. Cl.
CPC .............. *B60J 5/0481* (2013.01); *B60J 10/15* (2016.02); *B60J 10/27* (2016.02); *B60J 10/45* (2016.02); *B60J 10/86* (2016.02); *B60J 10/88* (2016.02); *B60R 13/0243* (2013.01); *B29L 2031/3041* (2013.01); *B60R 13/04* (2013.01)

(58) Field of Classification Search
USPC ...................................................... 296/146.7
See application file for complete search history.

(56) References Cited

U.S. PATENT DOCUMENTS

| | | | | |
|---|---|---|---|---|
| 5,356,194 | A * | 10/1994 | Takeuchi | B60R 13/04 296/146.9 |
| 5,462,292 | A * | 10/1995 | Yamane | B60J 10/24 277/637 |
| 5,649,405 | A * | 7/1997 | Morihara | B60J 10/24 296/146.2 |
| 5,775,768 | A * | 7/1998 | Yamane | B60J 10/24 296/146.9 |
| 5,791,722 | A * | 8/1998 | Nozaki | B60J 10/248 296/146.9 |
| 5,806,914 | A * | 9/1998 | Okada | B60J 10/248 296/146.9 |
| 6,115,967 | A * | 9/2000 | Warnecke | B60J 10/15 49/374 |
| 6,205,712 | B1 * | 3/2001 | Ellis | B60J 10/79 49/377 |
| 6,226,953 | B1 * | 5/2001 | Uno | B60J 10/00 52/716.1 |
| 6,625,931 | B2 * | 9/2003 | Omori | B60J 10/16 49/377 |
| 6,668,488 | B2 * | 12/2003 | Nozaki | B60J 10/74 296/146.2 |
| 6,723,414 | B2 * | 4/2004 | Aritake | B29C 45/14467 296/146.2 |
| 6,777,068 | B2 * | 8/2004 | Teramoto | B32B 25/14 277/921 |
| 7,070,224 | B2 * | 7/2006 | Tsuchida | B60J 10/90 296/107.04 |
| 8,979,164 | B2 * | 3/2015 | Jabra | B60J 10/0022 296/1.08 |
| 2001/0034976 | A1 | 11/2001 | Maass | |
| 2002/0035806 | A1 * | 3/2002 | Yamashita | B60J 10/24 49/498.1 |
| 2004/0079032 | A1 * | 4/2004 | Russell | F16J 15/027 49/498.1 |
| 2005/0129911 | A1 * | 6/2005 | Royse | B60J 10/80 428/141 |
| 2005/0235573 | A1 * | 10/2005 | Roush | B60J 10/235 49/493.1 |
| 2006/0112660 | A1 | 6/2006 | Mugishima et al. | |
| 2011/0204671 | A1 * | 8/2011 | Baratin | B60J 10/0051 296/93 |

FOREIGN PATENT DOCUMENTS

| | | |
|---|---|---|
| DE | 19803445 A1 | 9/1998 |
| DE | 102004004909 A1 | 8/2005 |
| DE | 102005028738 B3 | 3/2007 |

OTHER PUBLICATIONS

Combined Search and Examination Report under Section 17 and 18(3) for Application No. GB1219264.7 dated Jun. 25, 2013.
Combined Search and Examination Report under Sections 17 and 18(3) for Application No. GB1318992.3 dated May 14, 2014.

* cited by examiner

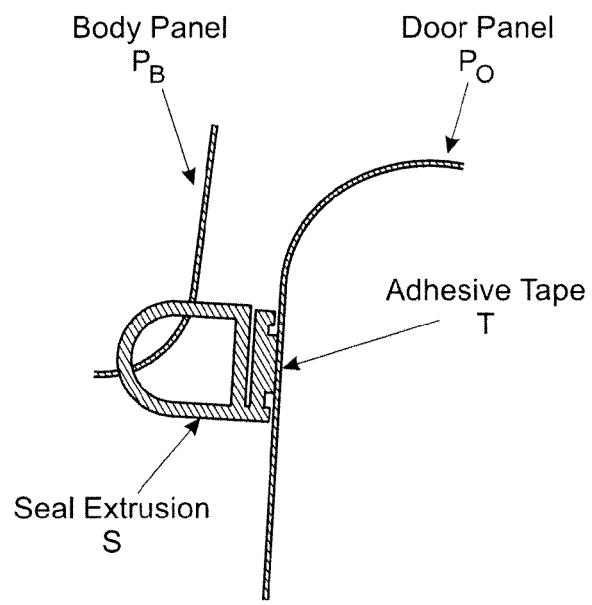
PRIOR ART    FIG. 1
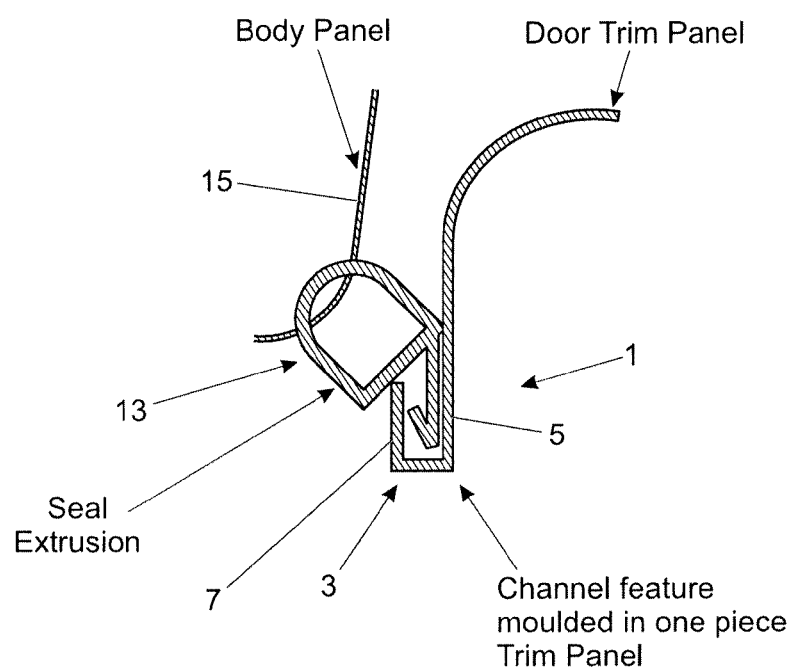
FIG. 2

DOOR MEMBER

TECHNICAL FIELD

The present invention relates to a door member; and to a vehicle door. More particularly, but not exclusively, the present invention relates to a door member for mounting a door seal. The present invention also relates to a door member defining an inner finisher and/or an outer finisher. The present invention also relates to a method of moulding a door member. Aspects of the invention relate to a door member, to a door, to a vehicle and to a method.

BACKGROUND

A primary door seal is mounted to a vehicle door frame to form a seal to prevent the ingress of water when the vehicle door is closed. The door seal can also provide insulation from external noises and vibrations.

As illustrated in FIG. 1, it is known to use an adhesive tape T for mounting a primary seal S to a door panel $P_D$. When the vehicle door is closed, the primary seal S cooperates with a body panel $P_B$. The accurate location of the primary seal S requires appropriate manufacturing facilities as the adhesive tape T cannot be re-positioned. Moreover, if the door seal is to be replaced, the adhesive tape T must be removed and the door panel $P_D$ cleaned to provide a suitable surface for bonding the replacement adhesive tape T.

An alternative technique is to use mechanical fasteners, such as clips, provided along the length of the seal. The mechanical fasteners typically retain the seal within a channel which is either formed in the door frame or attached to the door frame. Again, however, appropriate manufacturing facilities are required to secure the door seal in position. The attachment of a channel to the door frame can also necessitate a further manufacturing step.

At least in certain embodiments, the present invention sets out to overcome or ameliorate at least some of the above problems associated with the aforementioned prior art arrangements.

SUMMARY OF THE INVENTION

Aspects of the present invention relate to a door member, a vehicle door, a vehicle and a method of moulding a door member.

According to a further aspect of the present invention, there is provided a door member for mounting to a vehicle door, the door member being injection moulded from a plastics material and comprising an integral door seal mounting channel for receiving a mounting portion of a primary door seal for sealingly engaging a vehicle body panel when the vehicle door is closed. The door seal mounting channel is moulded integrally with the door member. At least in some embodiments, the door seal mounting channel can be formed by first and second cooperating moulds without the need for moveable side cores. At least one first projection can be provided on said first sidewall for engaging the mounting portion of said door seal. The at least one first projection can be formed integrally with the door member and, in use, can cooperate with the mounting portion to retain the door seal in position. Thus, the door trim according to the present invention can retain the door seal without the need for additional fasteners and/or adhesive. The door member thereby simplifies assembly and servicing of the door.

The door seal mounting channel can have a first sidewall and a second sidewall. The at least one first projection is provided on an inside of said first sidewall. The at least one first projection can project inwardly towards a centre of the door seal mounting channel. The at least one first projection can define a latch or retention feature for cooperating with the mounting portion of the door seal. The at least one first projection can comprise a guide surface for guiding the mounting portion into the door seal mounting channel. An underside of the at least one first projection can be adapted to engage the mounting portion of the door seal to retain the door seal in the door seal mounting channel. The underside of the at least one first projection can be defined by a male mould member. A first undercut can be formed on an underside of said at least one first projection for retaining the mounting portion of the door seal with the door seal mounting channel. The first undercut can form an acute angle or an obtuse angle with an adjacent surface of the first sidewall. Alternatively, the first undercut can be arranged substantially orthogonal with the adjacent surface of the first sidewall. A plurality of said first projections can be provided along the length of said first sidewall.

At least one second projection can be provided on said second sidewall for engaging the mounting portion of said door seal. The at least one second projection can be provided on an inside of said second sidewall. The at least one second projection can project inwardly towards a centre of the door seal mounting channel. An underside of the at least one second projection can be adapted to engage the mounting portion of the door seal to retain the door seal in the door seal mounting channel. The underside of the at least one first projection can be defined by a male mould member. A second undercut can be formed on an underside of each said at least one second projection for retaining the mounting portion of the door seal with the door seal mounting channel. The second undercut can form an acute angle or an obtuse angle with an adjacent surface of the second sidewall. Alternatively, the second undercut can be arranged substantially orthogonal with the adjacent surface of the second sidewall. The at least one second projection can define a latch or retention feature for cooperating with the mounting portion of the door seal. A plurality of said second projections can be provided along the length of said second sidewall.

The at least one first projection and the at least one second projection can be arranged to oppose each other.

An aperture can be formed in said door seal mounting channel proximal said at least one first projection and/or said at least one second projection. The aperture can be formed by a mould member (typically a male mould) configured to form the underside of said at least one first projection and/or an underside of said at least one second projection. The aperture can be adapted (in relation to its size and/or position) to facilitate retraction of said mould member. When the door seal mounting channel is being moulded, the mould member can extend through said aperture. Thus, the mould member extends through the door seal mounting channel to define the underside of the at least one first projection and/or the underside of the at least one second projection. The mould member can be retracted through said aperture when the door member has been moulded. The mould member can also define a portion of said first sidewall and/or said second sidewall. For example, the mould member can define the portion of the first sidewall and/or the second sidewall extending between the aperture and the respective first and second projections. Each aperture can extend longitudinally for a length equal to or greater than the longitudinal length of the first projection and/or second projection associated therewith. Each aperture can extend partially or completely across the width of said seal mounting channel (i.e. in a transverse direction). The extent of each aperture in said transverse direction can be equal to or greater than the corresponding extent of the corresponding projection in said transverse direction. Rather than form a single aperture extending across the width of the seal mounting channel, first and second apertures could be formed in the seal mounting channel for receiving mould members configured to define the underside of the respective first and second projections.

Each aperture can be offset from the corresponding first and/or second projection in an axial direction to enable the door member to be removed from the mould member during fabrication. Once the door member has been moulded, the door member and the mould member are moved relative to each other in said axial direction to separate the door member from the mould member. The axial direction is typically substantially parallel to an inner surface of the first and/or second sidewall of said door seal mounting channel.

According to a further aspect of the present invention, there is provided a door member for mounting to a vehicle door, the door member being injection moulded from a plastics material and comprising a door seal mounting channel for receiving a mounting portion of a door seal; at least one first projection being provided on a first sidewall of the door seal mounting channel for engaging the mounting portion of said door seal; wherein an aperture is formed in said door seal mounting channel proximal each said at least one first projection for retraction of a mould member which forms the underside of said first projection during injection moulding of the door member.

The door member can form an inner finisher (or capping) and/or an outer finisher (or capping). The door member can, for example, form a B-post of the vehicle door. The outer finisher can define an outer surface of said B-post. The inner finisher can define an inner surface of said B-post.

The door member can be profiled to cooperate with said upper window frame to form a seal along the length of the door member. The ingress of moisture between the door member and the upper window frame can thereby be inhibited. A sealing member, such as an elastomeric strip, can optionally be provided between the door member and the upper window frame.

The door member can further comprise a window seal mounting channel for mounting a glass run seal. The window seal can be a run seal for sealingly engaging the window. The window seal mounting channel can be moulded integrally with the door member.

At least one end of the door seal mounting channel can define an inset section for forming a flush lap joint. A width and/or depth of the door seal mounting channel can be reduced to form said inset section. The inset section allows an outer surface of the door seal mounting channel to be substantially continuous across a joint. The door seal can thereby form a continuous seal.

The door member can be fixedly mounted to the upper window frame. The upper window frame can be formed from metal, such as aluminium or steel. The window frame can be an extrusion, for example. The window frame can comprise a curved section and an upright section.

The present invention also relates to the combination of a door member as described herein with the upper window frame. The upper window frame can comprise a door seal mounting flange which forms a continuation of the door seal mounting channel. For example, the door seal mounting flange can be a continuation of a first sidewall of the door seal mounting channel. The door seal mounting flange can match the profile of the first sidewall of the door seal mounting channel. The door seal mounting flange can extend along a top section of said upper window frame. The upper window frame could define a door seal mounting channel.

According to a further aspect of the present invention, there is provided a method of moulding a door member as described herein, wherein said door seal mounting channel and said at least one first projection are moulded integrally by a first mould member and a second mould member. The first mould member and/or the second mould member can translate along an axis to split the mould and enable the door member to be removed. The door seal mounting channel and the at least one first projection can be formed without the use of a separate moveable core to release the door member. This arrangement can reduce the complexity of the mould. The at least one second projection can also be moulded integrally by said first and second mould members.

According to a further aspect of the present invention, there is provided a method of injection moulding a door member from a plastics material, the door member comprising a door seal mounting channel for receiving a mounting portion of a door seal; the method comprising using a first mould member and a second mould member to integrally mould said door seal mounting channel and at least one first projection on a first sidewall of said door seal mounting channel; wherein the first mould member forms an underside of said at least one first projection and the method comprises retracting the first mould member through an aperture formed in said door seal mounting channel proximal to said at least one first projection.

The first mould member can also define an underside of said at least one second projection. Alternatively, separate mould members could be provided to define the undersides of the first and second projections.

The first mould member can define: (a) the aperture in said door seal mounting channel; and/or (b) a section of said first sidewall extending between said aperture and said first projection; and/or (c) a section of said second sidewall extending between said aperture and said second projection.

The second mould member can form an upper surface of said at least one first projection and/or an upper surface of said at least one second projection.

The features of the door member described herein can be incorporated into other injection moulded components. According to a still further aspect of the present invention there is provided an injection moulded component comprising a channel for receiving a mounting portion of a seal; at least one first projection being provided on a first sidewall of the channel for engaging the mounting portion of said seal; and wherein an aperture is formed in said seal mounting channel proximal each said at least one first projection for retraction of a mould member which forms an underside of said at least one first projection during injection moulding of the component. Each aperture can extend longitudinally for a length equal to or greater than the longitudinal length of the first projection and/or second projection associated therewith. Each aperture can extend partially or completely across the width of said mounting channel (i.e. in a transverse direction). The extent of each aperture in said transverse direction can be equal to or greater than the corresponding extent of the corresponding projection in said transverse direction. Rather than form a single aperture extending across the width of the seal mounting channel, first and second apertures could be formed in the seal mounting channel for receiving mould members configured to define the underside of the respective first and second projections.

The method(s) of moulding a door member described herein can be implemented into methods for moulding other components. According to a yet further aspect of the present invention there is provided a method of injection moulding a component comprising a mounting channel having a first sidewall; the method comprising using a first mould member and a second mould member to integrally mould said mounting channel and at least one first projection on said first sidewall; wherein the first mould member forms an underside of said at least one first projection and the method comprises retracting the first mould member through an aperture formed in said mounting channel proximal to said at least one first projection.

According to a further aspect of the present invention, there is provided a door member for mounting to an upper window frame of a vehicle door, the door member being moulded from a plastics material and comprising an inner post finisher and/or an outer post finisher, wherein said door member is profiled to cooperate with said upper window frame to form a seal. The door member can abut the upper window frame to form the seal. The seal can prevent the ingress of moisture between the door member and the upper window frame. The door member can be profiled to form the seal along the length of the door member.

The door member can further comprise a window seal mounting channel for mounting a glass run seal. The glass run seal forms a groove in which a window can travel. The door member can further comprise an inner corner finisher. The door member can define a hand grab for opening and closing the vehicle door. One or more fixings can be provided on the door member for mounting top frame brightwork and/or an outer waist seal.

The door member can be fixedly mounted to said upper window frame. The door member can be bonded, mechanically fixed, or overmoulded to the upper window frame. The inner post finisher and the outer post finisher could be overmoulded simultaneously or in sequence. The door member could comprise a metal support. The door member could, for example, be overmoulded on said metal support. The door member could be manufactured as one piece, for example using mould sliders or gas injection methods.

The door member can further comprise a door seal mounting channel for receiving a mounting portion of a door seal. The door seal mounting channel can comprise a first sidewall and a second sidewall. At least one first projection can be provided on the first sidewall for engaging the mounting portion of said door seal. At least one second projection can be provided on the second sidewall for engaging the mounting portion of said door seal.

The upper window frame can comprise a door seal mounting flange which forms a continuation of the door seal mounting channel. The door seal mounting flange can extend along a top section of said upper window frame.

According to a further aspect of the present invention, there is provided an upper window frame comprising the door member of the type described herein. The door member can be fixedly mounted to the upper window frame. The upper window frame can comprise a door seal mounting flange which forms a continuation of said first sidewall of the door seal mounting channel. The door seal mounting flange can match the profile of the first sidewall. The door seal mounting flange can extend along a top section of the upper window frame.

According to a still further aspect of the present invention, there is provided a door member for mounting a door seal to a vehicle door, the door member being moulded from a plastics material and comprising a first door seal mounting channel for receiving a mounting portion of said door seal, wherein at least one end of said first door seal mounting channel defines an inset section for forming a lap joint. A nested joint can be formed which forms an aligned, continuous joint for receiving the door seal. This configuration can prevent water ingress and potentially also the ingress of external noise, vibration and harshness (NVH). In use, the outer surface of the first door seal mounting channel can be substantially flush for cooperating with the door seal, thereby forming a continuous seal. The inset section can form a flush lap joint.

A width and/or a depth of the first door seal mounting channel can be reduced to form said inset section. A Z-shaped section (or step) can be formed in a sidewall and/or a base of said first door seal mounting channel to form the inset section.

According to a further aspect of the present invention, there is provided a door member for mounting to a vehicle door, the door member being injection moulded from a plastics material and comprising a door seal mounting channel for receiving a mounting portion of a door seal. The door member can be a door trim panel.

The door member described herein can be a door trim panel or a door casing.

According to a yet further aspect of the present invention, there is provided a combination of a door member as described herein and a second door member having a second door seal mounting channel. The inset section of the first door seal mounting channel can be located inside the second door seal mounting channel to form the flush lap joint. The door seal can accommodate a small reduction in the width and/or depth of the door seal mounting channel. Accordingly, the door seal can locate inside the door seal mounting channel.

An outer surface of the first and second door seal mounting channels can be substantially continuous across said lap joint. The lap joint can be a flush lap joint. The sealing integrity and/or visual quality of the joint can be improved.

The combination can further comprise a door seal having a mounting portion located in first and second door seal mounting channels. The door seal can extend across the lap joint. The second door member can comprise a door trim panel or a door casing.

According to a still further aspect of the present invention there is provided a first component for mounting a seal, the first component being injection moulded from a plastics material and comprising a first seal mounting channel for receiving a mounting portion of said seal, wherein an end of said first seal mounting channel defines a first inset section for forming a lap joint with a cooperating component. The first seal mounting channel can comprise first and second sidewalls. The first inset section can be formed in the first sidewall of the first component.

According to a yet further aspect of the present invention there is provided an assembly comprising a first component as described herein and a second component comprising a second seal mounting channel. The end of the first seal mounting channel can be disposed inside the second seal mounting channel. The second seal mounting channel can comprise first and second sidewalls corresponding to the first and second sidewalls of the first seal mounting channel. The first wall of the first seal mounting channel can be arranged in an overlapping arrangement with the first wall of the second seal mounting channel. The second wall of the first seal mounting channel can be arranged in an overlapping arrangement with the second wall of the second seal mounting channel.

The second seal mounting channel can define an enlarged cross section at the end thereof to receive the end of the first seal mounting channel. A step change in the profile of the first sidewall and/or the second sidewall of said second seal mounting channel can define the increase in cross section. The first sidewall of the second seal mounting channel can comprise a first step or recess to receive the first sidewall of the first seal mounting channel. The second sidewall of the second seal mounting channel can comprise a second step or recess to receive the second sidewall of the first seal mounting channel. Furthermore, a base of the second seal mounting channel (i.e. the section extending transversely between the first and second sidewalls) can comprise a step for receiving a corresponding section of the first seal mounting channel.

The first seal mounting channel can define a reduced cross section at the end thereof to locate in the end of the second seal mounting channel. A step change in the profile of the first sidewall and/or the second sidewall of said first seal mounting channel can define the reduction in cross section.

The present invention also relates to a vehicle comprising one or more doors having a door member of the type described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 1 shows a prior art arrangement for mounting a door seal to a vehicle door panel;

FIG. 2 shows a schematic sectional view of a door trim panel according to a first embodiment of the present invention;

DETAILED DESCRIPTION

Figure 3A:
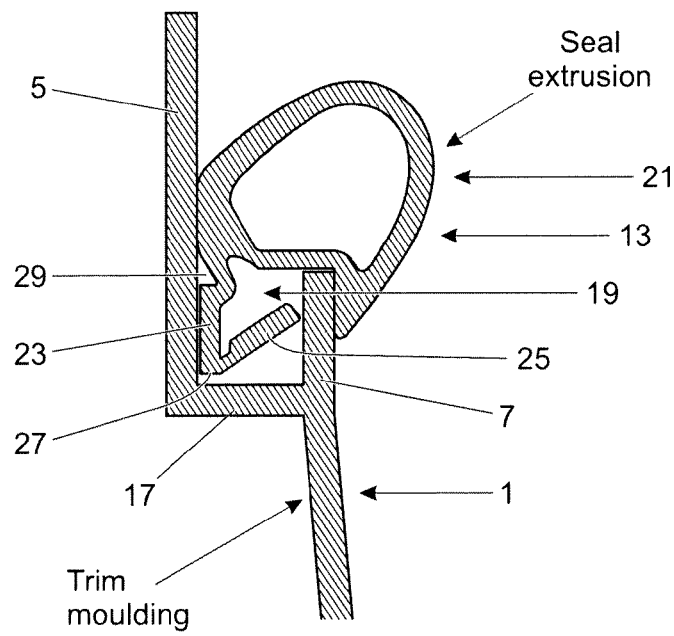
FIGS. 3A and 3B show enlarged sectional views of the door trim panel shown in FIG. 2.

A door trim panel 1 for forming part of a vehicle door structure in accordance with a first embodiment of the present invention will be described with reference to FIGS. 2 to 5.

The door trim panel 1 comprises an upper door seal mounting channel 3 defined by first and second sidewalls 5, 7 having respective first and second latching projections 9, 11. The upper mounting channel 3 retains a primary door seal 13 for sealingly engaging a vehicle body panel 15 when the vehicle door is closed, as illustrated in FIG. 2. A plurality of said first and second latching projections 9, 11 is formed along the length of the upper mounting channel 3 to engage the primary door seal 13. In the present embodiment, the first and second latching projections 9, 11 are arranged in opposing pairs.

Figure 3B:
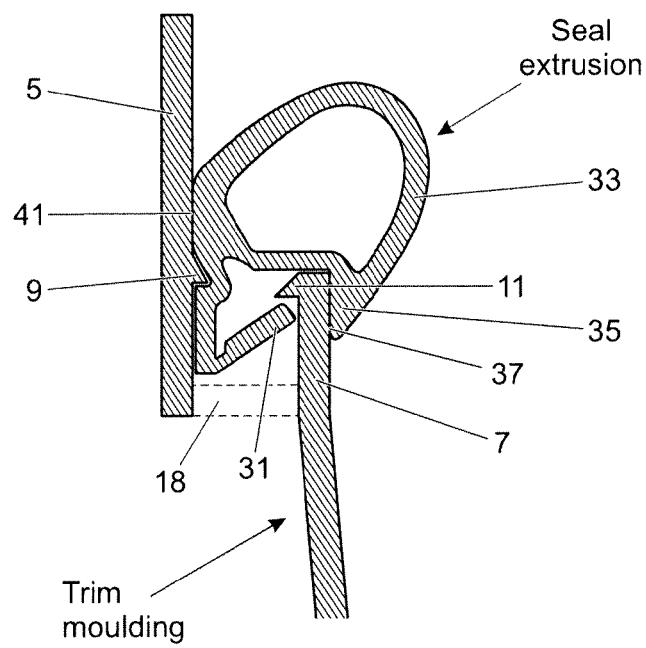
Figure 4A:
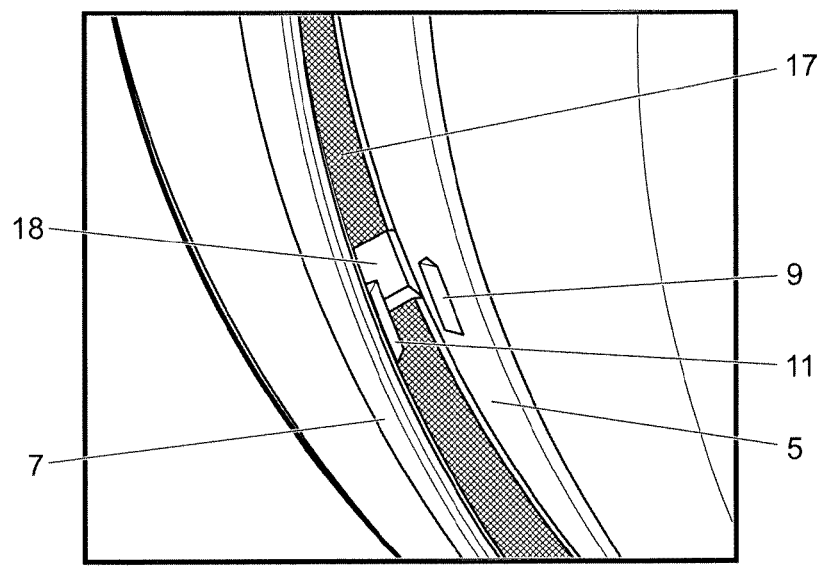
FIGS. 4A and 4B show perspective views of a clip formed in the door trim panel shown in FIGS. 2 and 3.
Figure 4B:
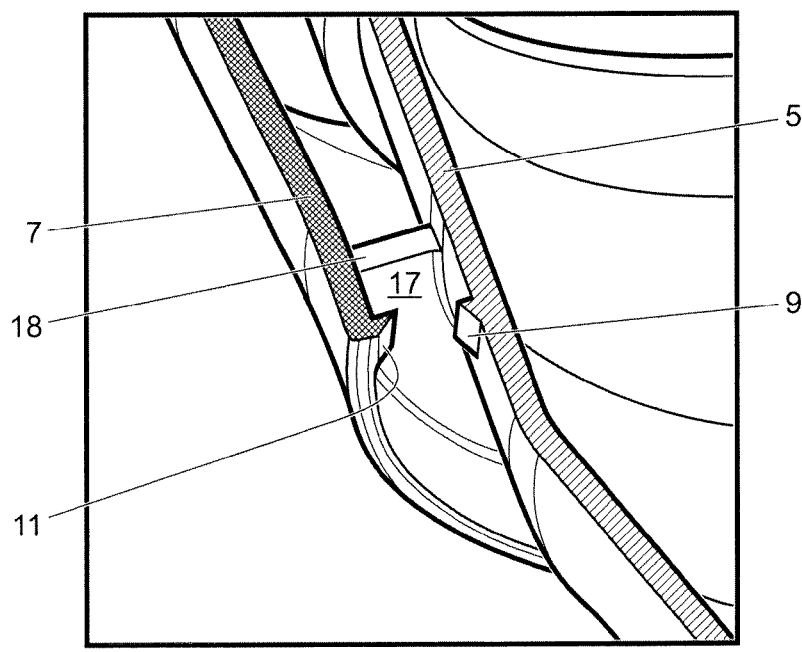
Figure 4C:
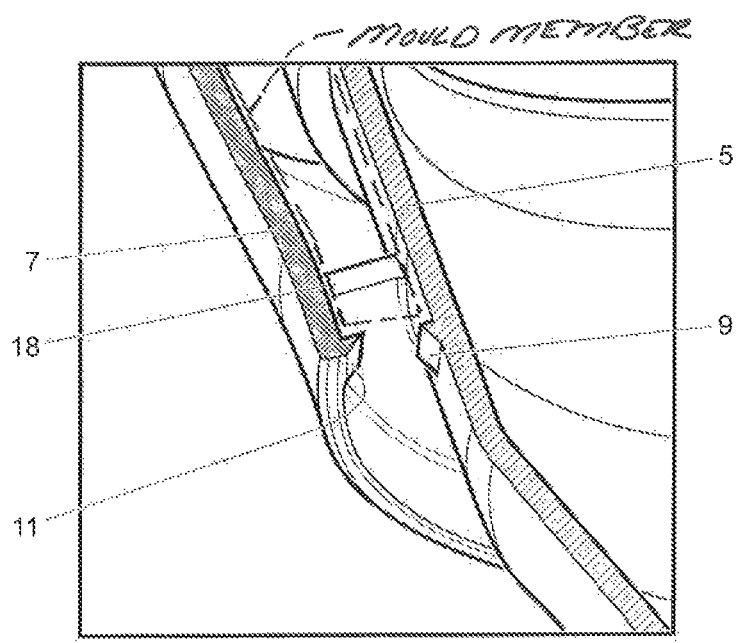

The door trim panel 1 is a one-piece plastics moulding formed by injection moulding. The sectional views in FIGS. 3A and 3B are at different positions along the upper mounting channel 3 and shows the intermittent arrangement of the first and second latching projections 9, 11 along the length of the upper mounting channel 3. A channel floor section 17 joins the first and second sidewalls 5, 7 of the upper mounting channel 3. As shown most clearly in FIG. 4A, a rectangular aperture 18 is formed in the channel floor section 17 coincident with each pair of the first and second latching projections 9, 11. The aperture 18 is formed by a male mould (not shown) which defines an undercut on an under side of the first and second latching projections 9, 11. A female mould (not shown) forms a sloping upper side of the first and second latching projections 9, 11 for receiving the primary door seal 13. A sectional perspective view of the first and second latching projections 9, 11 and the aperture 18 is shown in FIG. 4B. The upper mounting channel 3 and the latching projections 9, 11 are configured to enable moulding without movable cores (for example moveable side cores). Thus, the door trim panel 1 can be moulded in a mould consisting of said male and female moulds which can be separated to enable the moulded component to be removed. The ability to form the door trim panel 1 without movable cores reduces the complexity of the moulding process.

The door seal 13 is an elongate member having a uniform cross section which is formed by extruding an elastomeric material. The door seal 13 comprises a mounting portion 19 and a sealing portion 21. The mounting portion 19 comprises first and second strips 23, 25 which are pivotally connected to each other along a common edge 27 to form a live hinge. An elongate detent 29 is formed in an outside surface of the first strip 23 to cooperate with the first latching projections 9 formed in the first sidewall 5 of the upper mounting channel 3. The first and second strips 23, 25 are biased to an open position such that the second strip 25 cooperates with an inner surface of the second sidewall 7 to bias the door seal 13 towards the first sidewall 5. A distal end 31 of the second strip 25 cooperates with the second latching projections 11 to retain the mounting portion 19 within the upper mounting channel 3.

The sealing portion 21 of the door seal 13 is conventional insofar as it comprises a closed D-shaped section 33 for sealingly engaging the vehicle body panel 15 when the vehicle door is closed. As shown in FIGS. 3A and 3B, a projecting edge 35 extends from said D-shaped section 33 and abuts an outer surface of the second sidewall 7 to form an outer seal 37. An inner surface 39 of the sealing portion 19 abuts the first sidewall 5 to form an inner seal 41.

Figure 5:
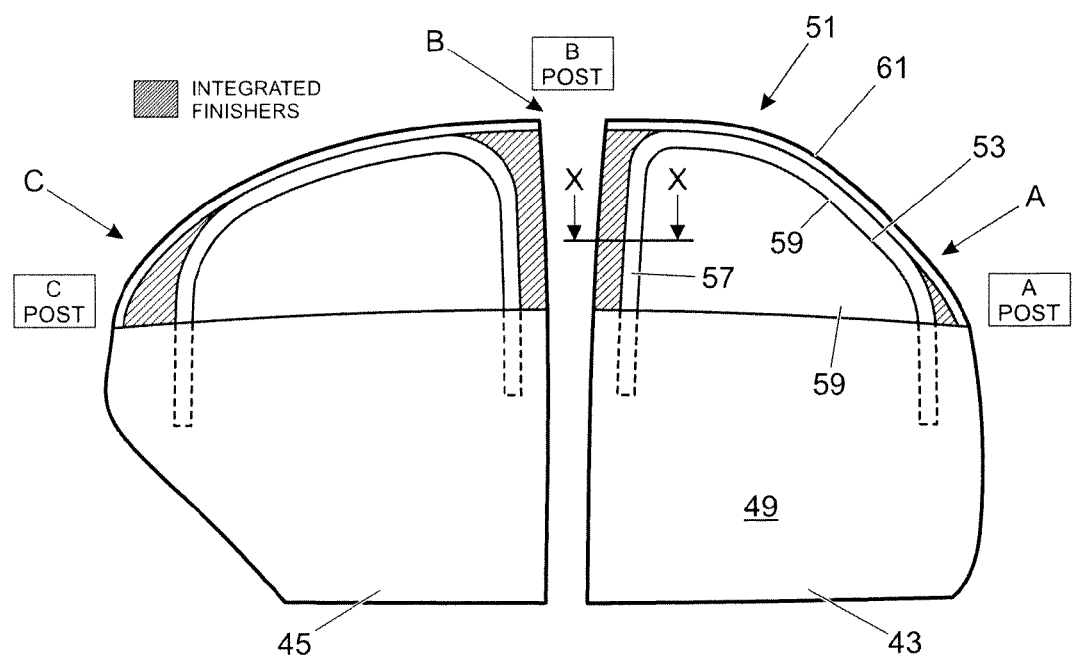
FIG. 5 shows a schematic side elevation of the front door and the back door of a motor vehicle.
Figure 6:
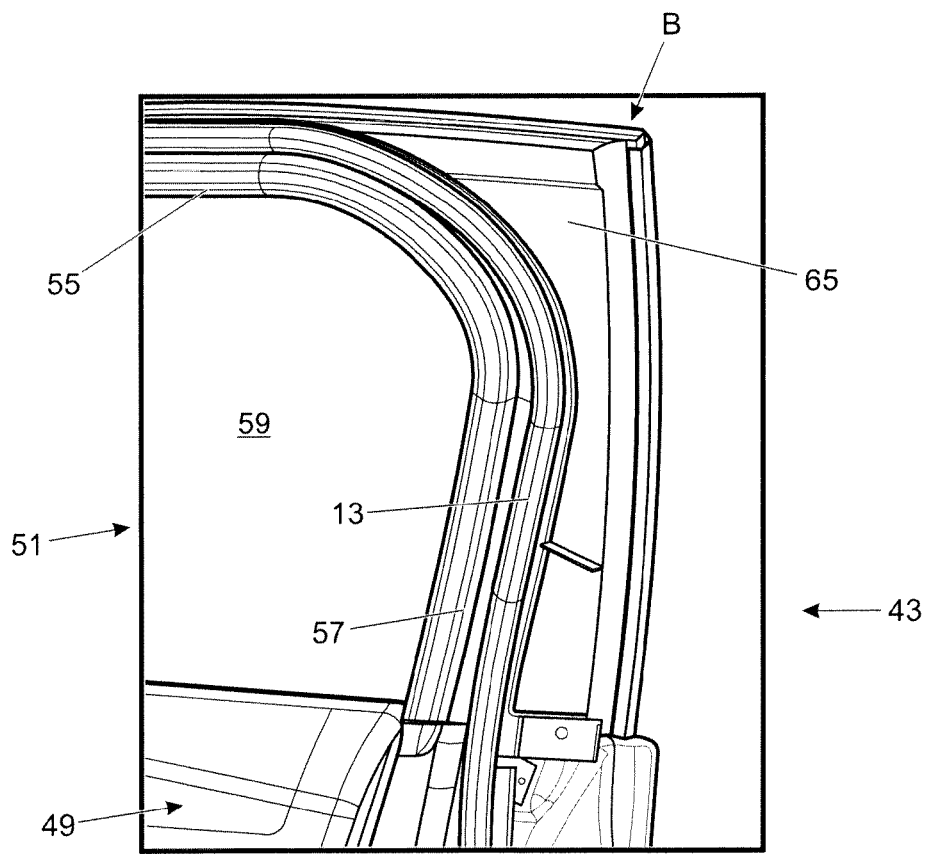
FIG. 6 shows a perspective view of an inside of an upper door frame assembly shown in FIG. 5.

The mounting of the door panel trim 1 to the vehicle door structure will now be described with reference to FIGS. 5, 6 and 7. A side elevation of front and back vehicle doors 43, 45 of a motor vehicle are shown in FIG. 5. The front of the front door 43 defines an A-post (A); the back of the front door 43 and the front of the back door 45 together define a B-post (B); and the back of the back door 45 defines a C-post (C). As shown most clearly in FIG. 6, the door trim panel 1 described herein is located at the back of the front vehicle door 43 and forms a structural component of the B-post (B). Specifically, the door trim panel 1 forms a grab region which can be gripped by a user as they open and close the vehicle door. An external finisher 47 is mounted to the door trim panel 1 to provide an exterior contact surface.

The front vehicle door 43 comprises a lower door assembly 49 and an upper frame assembly 51. The upper frame assembly 51 comprises a window frame 53 extruded from metal (for example aluminium or steel) and fixedly mounted to the lower door assembly 49. The window frame 53 comprises a curved upper section 55 and a rear section 57 which together surround a window 59 movably mounted in the front vehicle door 43. The rear section 57 of the window frame 53 extends substantially vertically and forms a front section of the B-post (B). A top frame finisher 61, for example comprising brightwork, is mounted to the curved upper section 55.

Figure 7:
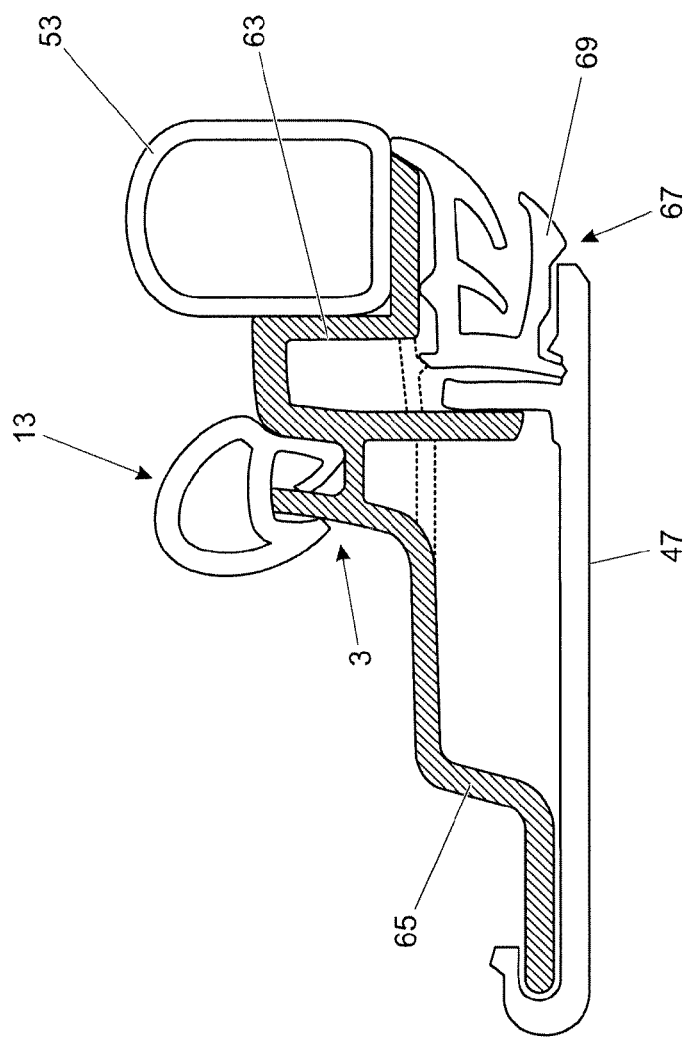
FIG. 7 shows a sectional view of a B-post of the front door shown in FIGS. 5 and 6.

A sectional view along line X-X is shown in FIG. 7. The door trim panel 1 comprises a mounting bracket 63 which abuts the rear section 57 of the window frame 53 to form a seal along the length of the door trim panel 1. The mounting bracket 63 is mechanically attached to the rear section 57, for example using screws, rivets, bolts or other mechanical fasteners. A sealant or seal member could optionally be provided between the mounting bracket 63 and the window frame 53. The door trim panel 1 comprises an internal finisher 65 which, in use, hides the window frame 53 from view. The external finisher 47 is mounted to an outside of the door trim panel 1. A glass mounting channel 67 is formed between the mounting bracket 63 and the decorative finisher 47 to receive a glass run seal 69 for sealingly engaging the window 59.

Figure 8A:
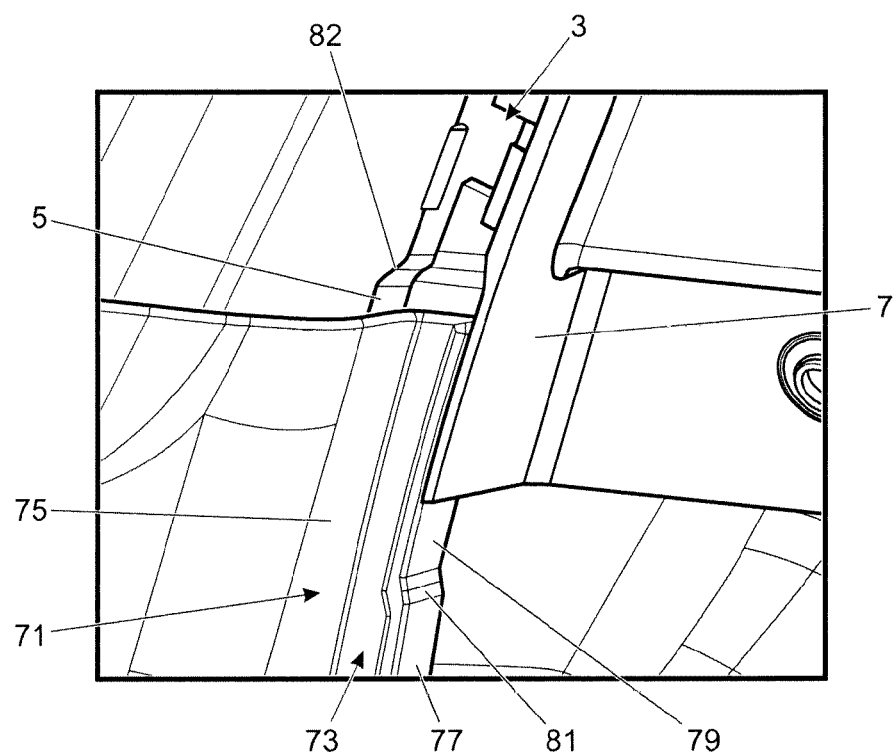
FIGS. 8A and 8B show perspective views of a joint arrangement for mounting the door trim panel.
Figure 8B:
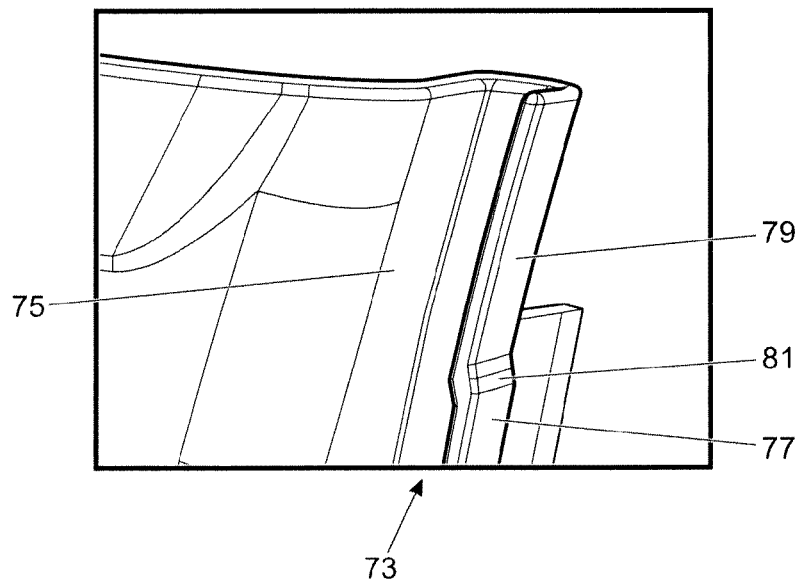

A perspective view of the bottom of the door trim panel 1 is shown in FIGS. 8A and 8B. A door casing 71 forms part of the lower door assembly 49 and is configured to mate with the bottom of the door trim panel 1. The door casing 71 is also injection moulded from a plastics material. The door casing moulding 71 comprises a lower door seal mounting channel 73 for retaining the door seal 13. The lower mounting channel 73 is defined by third and fourth sidewalls 75, 77 optionally having respective third and fourth latching projections (not shown) provided along its length. FIG. 8A shows the door trim panel 1 and the door casing 71 coupled to each other; and FIG. 8B shows the door casing 71 in isolation.

An upper end of the lower mounting channel 73 defines an interface section 79 in which the width of the lower mounting channel 73 is reduced so as to locate inside the upper mounting channel 3. The fourth sidewall 77 of the lower mounting channel 73 has an outer Z-shaped inset 81 at the entry into said interface section 79. The inset 81 locates inside the second sidewall 7 allowing a flush lap joint to be formed at the junction between the second sidewall 7 and the fourth sidewall 77. In the present embodiment, a lower end of the first sidewall 5 also forms an inner Z-shaped inset 82 for receiving an upper end of the third sidewall 75. The second sidewall 77 has a reduced thickness for accommodating the outer Z-shaped inset 81, as shown in FIG. 8A. This arrangement is particularly advantageous as the interface between the outer surface of the second sidewall 7 and the fourth sidewall 77 is substantially continuous without any outwardly directed projections. Thus, a substantially uniform, uninterrupted surface is defined by the outer surfaces of the second sidewall 7 and the fourth sidewall 77 for cooperating with the projecting edge 35 of the sealing portion 21 of the door seal 13. The door seal 13 can thereby maintain a seal across the junction of the second sidewall 7 and the fourth sidewall 77. It will be appreciated that the interface section 79 could be defined at the bottom end of the upper mounting channel 3. Advantageously, the lower mounting channel 73 and the outer Z-shaped inset 81 can be moulded integrally using a two-part (male/female) mould without moveable side cores.

The configuration of the upper mounting channel 3 according to the present invention allows the door seal 13 to be mechanically mounted to the door trim panel 1 without the need for separate clips or adhesive. The assembly of the door frame structure can therefore be simplified. This mounting arrangement also allows the door seal 13 to be removed and re-fitted/replaced without the need for door cleaning and re-attachment of an adhesive tape. The door trim panel 1 defines an internal finisher 65 for improving the appearance of the door frame structure. The door trim panel 1 also forms a structural component of the door frame structure and can improve strength and/or rigidity of the upper frame assembly 51.

Moreover, the upper mounting channel 3 can provide a continuous, uniform mounting arrangement for the door seal 13 at the interface between the door trim panel 1 and the window frame 53. For example, the upper mounting channel 3 can be aligned with a matching seal mounting flange (not shown) formed in the window frame 53. The joint can be configured to form a substantially uniform outer surface to provide a continuous outer surface for the door seal 13. For example, a flush lap joint can be formed to join the upper mounting channel 3 and the seal mounting flange.

Figure 9:
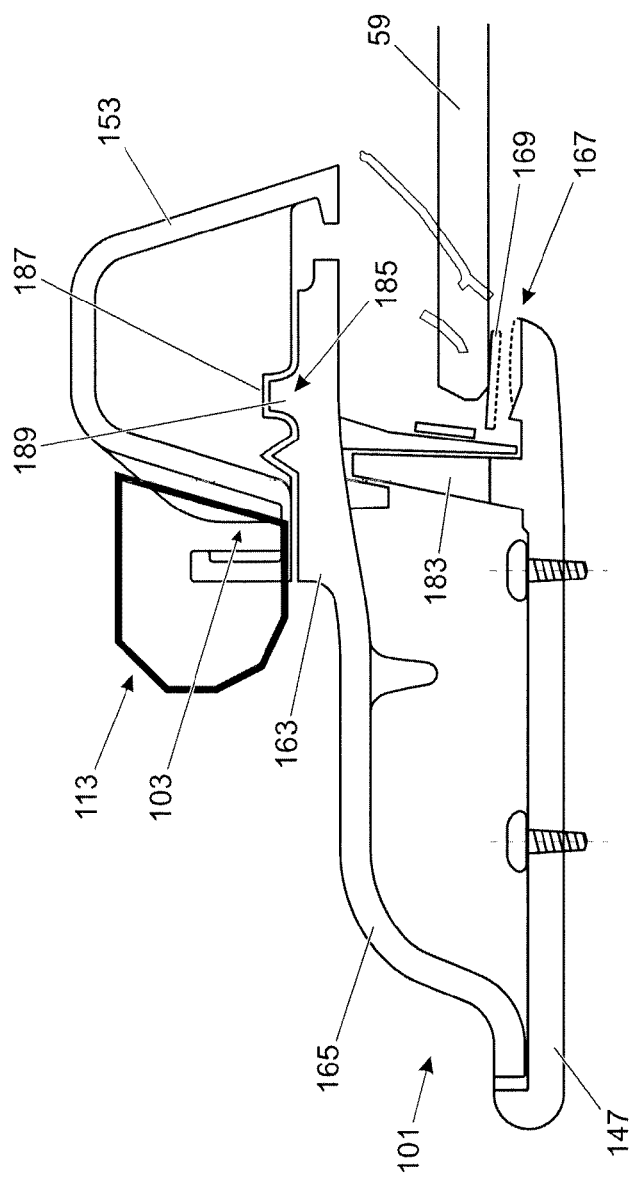
FIG. 9 shows a sectional view of a B-post according to a second embodiment of the present invention.

A sectional view along line X-X of FIG. 5 of a second embodiment of the door trim panel 101 according to the present invention is shown in FIG. 9. Like reference numerals will be used for like components albeit incremented by 100 for clarity.

The door trim panel 101 is a one-piece moulding which defines both the external finisher 147 and the internal finisher 165. The door trim panel 101 also defines the glass mounting channel 167 for receiving the glass run seal 169. The door trim panel 101 further comprises a reinforcing stringer 183 and optionally one or more transverse ribs (not shown) extending between the external finisher 147 and the internal finisher 165. The door seal mounting channel 103 for mounting the door seal 113 could optionally be formed integrally with the window frame 53 in the present embodiment.

The window frame 153 further comprises a keyed surface 185 for engaging the door trim panel 101. The keyed surface 185 comprises a rectangular channel 187 for receiving an elongate protuberance 189 formed in the mounting bracket 163. The interaction of the channel 187 and the protuberance 189 forms a seal to prevent the ingress of moisture. The door trim panel 101 is mounted to the window frame by mechanical fasteners, such as screws, and optionally also an adhesive. The door trim panel 101 is also mounted to the lower door assembly 149 by mechanical fasteners 179.

The door trim panel 101 is a structural component and reinforces the window frame 153. In use, the user can apply a closing pressure to the door trim panel 101 to close the front vehicle door. The door trim panel 101 also defines the interior and exterior surfaces of the B-post and can improve the appearance of the front vehicle door.

It will be appreciated that various changes and modifications can be made to the door trim panel 1; 101 described herein without departing from the scope of the present invention. For example, the present invention has been described with reference to a vehicle door for providing entry to a vehicle cabin. However, it will be appreciated that the present invention could also be embodied in a vehicle door for providing access to a boot (trunk) or an engine bay.

Further aspects of the present invention are set out in the following numbered paragraphs:

1. A door member for mounting to a vehicle door, the door member being injection moulded from a plastics material and comprising an integral door seal mounting channel for receiving a mounting portion of a primary door seal for sealingly engaging a vehicle body panel when the vehicle door is closed.
2. A door member as described in paragraph 1, wherein at least one first projection is provided on a first sidewall of the door seal mounting channel for engaging the mounting portion of said door seal.
3. A door member as described in paragraph 1, wherein at least one second projection is provided on a second sidewall of the door seal mounting channel for engaging the mounting portion of said door seal.
4. A door member as described in paragraph 3, wherein said first projection(s) opposes said second projection(s).
5. A door member as described in paragraph 2, wherein an aperture is formed in said door seal mounting channel proximal said at least one first projection and/or said at least one second projection.
6. A door member as described in paragraph 5, wherein each aperture is adapted for retraction of a mould member which forms the underside of said at least one first projection and/or said at least one second projection during injection moulding of the door member.
7. A door member as described in paragraph 1, wherein said door member forms an inner finisher and/or an outer finisher.
8. A door member as described in paragraph 1, wherein said door member is profiled to cooperate with said upper window frame to form a seal along the length of the door member.
9. A door member as described in paragraph 1, wherein said door member further comprises a window seal mounting channel for mounting a glass run seal.
10. A door member as described in paragraph 1, wherein at least one end of said door seal mounting channel defines an inset section for forming a flush lap joint.
11. A door member as described in paragraph 1, wherein the door member forms a door trim panel.
12. A vehicle door comprising a door member as described in paragraph 11, wherein the door member is disposed on an interior of the vehicle door.
13. A vehicle door comprising a door member as described in paragraph 1, wherein the door member is mounted to an upper window frame; said upper window frame optionally comprising a door seal mounting flange which forms a continuation of said door seal mounting channel.
14. A method of moulding a door member as described in paragraph 1, wherein said door seal mounting channel and said at least one first projection are moulded integrally by a first mould member and a second mould member.
15. A method of injection moulding a door member from a plastics material, the door member comprising a door seal mounting channel for receiving a mounting portion of a door seal; the method comprising using a first mould member and a second mould member to integrally mould said door seal mounting channel and at least one first projection on a first sidewall of said door seal mounting channel; wherein the first mould member forms an underside of said at least one first projection and the method comprises retracting the first mould member through an aperture formed in said door seal mounting channel proximal to said at least one first projection.
16. A method as described in paragraph 15, wherein the first mould member defines an underside of said at least one second projection.
17. A method as described in paragraph 15, wherein the first mould member defines the aperture in said door seal mounting channel; and/or a section of said first sidewall extending between said aperture and said first projection; and/or a section of said second sidewall extending between said aperture and said second projection.
18. A method as described in paragraph 15, wherein said second mould member forms an upper surface of said first projection and/or said second projection.
19. An injection moulded component comprising a channel for receiving a mounting portion of a seal; at least one first projection being provided on a first sidewall of the channel for engaging the mounting portion of said seal; and wherein an aperture is formed in said seal mounting channel proximal each said at least one first projection for retraction of a mould member which forms an underside of said at least one first projection during injection moulding of the component.
20. A method of injection moulding a component comprising a mounting channel having a first sidewall; the method comprising using a first mould member and a second mould member to integrally mould said mounting channel and at least one first projection on said first sidewall;

wherein the first mould member forms an underside of said at least one first projection and the method comprises retracting the first mould member through an aperture formed in said mounting channel proximal to said at least one first projection.
21. A door member for mounting a door seal to a vehicle door, the door member being moulded from a plastics material and comprising a first door seal mounting channel for receiving a mounting portion of said door seal, wherein at least one end of said first door seal mounting channel defines an inset section for forming a lap joint.
22. A door member as described in paragraph 21, wherein a width and/or depth of said first door seal mounting channel is reduced to form said inset section.
23. A door member as described in paragraph 22, wherein a Z-shaped section is formed in a sidewall and/or a base of said first door seal mounting channel to form said inset section.
24. A door member as described in paragraph 21, wherein said door member is a door trim panel or a door casing.
25. A combination of a door member as described in paragraph 21 and a second door member having a second door seal mounting channel, wherein said inset section of the first door seal mounting channel is located inside said second door seal mounting channel to form said lap joint.
26. A combination as described in paragraph 25, wherein an outer surface of said first and second door seal mounting channels is substantially continuous across said lap joint.
27. A combination as described in paragraph 25, further comprising a door seal having a mounting portion located in first and second door seal mounting channels, the door seal extending across said lap joint.

28. A combination as described in paragraph 25, wherein said second door member is a door trim panel or a door casing.

29. A first component for mounting a seal, the first component being injection moulded from a plastics material and comprising a first seal mounting channel for receiving a mounting portion of said seal, wherein an end of said first seal mounting channel defines a first inset section for forming a lap joint with a cooperating second component.

30. An assembly comprising a first component as described in paragraph 29 and a cooperating second component comprising a second seal mounting channel, wherein an end of said second seal mounting channel cooperates with said first inset section to form said lap joint.

31. An assembly as described in paragraph 30 the end of the first seal mounting channel is located in the end of the second seal mounting channel.

32. An assembly as described in paragraph 30, wherein said first and second seal mounting channels align with each other to form a continuous mounting channel.

33. A vehicle comprising a door member as described in paragraph 1 any one of claims 21 to 24 mounted to a vehicle door.

34. A vehicle comprising a door member as described in paragraph 21 mounted to a vehicle door.

The invention claimed is:

1. A door member for mounting to a vehicle door, the door member comprising an integral door seal mounting channel for receiving a mounting portion of a primary door seal for sealingly engaging a vehicle body panel when the vehicle door is closed, the door member and the door seal mounting channel being injection molded from a plastics material,
   wherein the injection molded plastic material secures the door member and the door seal mounting channel together to define a single-piece structure comprising the door member and the door seal mounting channel,
   wherein at least one first projection is provided on a first sidewall of the door seal mounting channel for engaging the mounting portion of said door seal, the at least one first projection having an underside facing a channel floor section of the door seal mounting channel;
   wherein an aperture is formed in the channel floor section of the door seal mounting channel aligned with the at least one first projection, the aperture facing the underside of the at least one first projection such that an area encompassed by the aperture lies directly beneath the at least one first projection;
   wherein the aperture extends longitudinally for a length equal to or greater than a longitudinal length of the at least one first projection;
   wherein the aperture is configured for retraction of a mould member which forms the underside of said at least one first projection during injection moulding of the door member.

2. A door member as claimed in claim 1, wherein at least one second projection is provided on a second sidewall of the door seal mounting channel for engaging the mounting portion of said door seal, wherein said at least one first projection opposes said at least one second projection.

3. A door member as claimed in claim 2, wherein the aperture is aligned with said at least one second projection.

4. A door member as claimed in claim 3, wherein said at least one second projection includes an underside facing the aperture.

5. A door member as claimed in claim 1, wherein said door member forms at least one of an inner finisher and an outer finisher.

6. A door member as claimed in claim 1, wherein said door member further comprises a window seal mounting channel for mounting a glass run seal.

7. A door member as claimed in claim 1, wherein at least one end of said door seal mounting channel defines an inset section for forming a flush lap joint.

8. A door member as claimed in claim 1, wherein the door member forms a door trim panel.

9. A vehicle door comprising a door member as claimed in claim 8, wherein the door member is disposed on an interior of the vehicle door.

10. A vehicle door comprising a door member as claimed in claim 1, wherein the door member is mounted to an upper window frame.

11. A vehicle comprising a door member as claimed in claim 1, mounted to a vehicle door.

12. A vehicle door as claimed in claim 10, wherein said door member comprises a profile configured to cooperate with said upper window frame to form a seal along the length of the door member.

13. A door member as claimed in claim 1, wherein the entire door member and the entire door seal mounting channel comprise the same injection molded plastic material.

14. A door member as claimed in claim 1, wherein the injection molded plastic material is continuous between the door member and the door seal mounting channel.

15. A door member as claimed in claim 1, wherein the door member and the door seal mounting channel are injection molded simultaneously.

16. A door member as claimed in claim 1, wherein the aperture extends at least partially across a width of the door seal mounting channel that is equal to or greater than a width of the at least one first projection.

* * * * *